United States Patent [19]
VanNoord

[11] Patent Number: 4,887,725
[45] Date of Patent: Dec. 19, 1989

[54] STORAGE RACK ASSEMBLY

[75] Inventor: Andrew J. VanNoord, Grand Rapids, Mich.

[73] Assignee: Kent Design & Mfg., Inc., Grand Rapids, Mich.

[21] Appl. No.: 111,442

[22] Filed: Oct. 21, 1987

[51] Int. Cl.⁴ .............................................. A47G 19/08
[52] U.S. Cl. ........................................ 21/41; 211/195
[58] Field of Search ................ 211/40, 41, 119, 191, 211/181; 312/9, 10, 15, 17; 206/387

[56] References Cited

U.S. PATENT DOCUMENTS

| | | |
|---|---|---|
| 1,074,796 | 10/1913 | Jones ................................ 211/162 X |
| 1,407,938 | 2/1922 | Gallaway . |
| 2,281,845 | 5/1942 | Kaplan ................................ 211/40 |
| 2,532,673 | 8/1947 | Mossett . |
| 2,720,204 | 5/1951 | Wallach . |
| 2,892,548 | 5/1957 | Huff . |
| 2,901,119 | 8/1959 | Almer ............................ 211/195 X |
| 2,916,153 | 7/1956 | Saul, Jr. . |
| 2,959,293 | 11/1957 | Von Meyer . |
| 3,114,459 | 8/1961 | Kersting . |
| 3,318,453 | 2/1965 | Cavanagh . |
| 3,332,558 | 7/1967 | Wilson ............................ 211/195 X |
| 3,347,393 | 2/1966 | Frey . |
| 3,446,360 | 10/1966 | Gutierrez . |
| 3,800,958 | 4/1974 | Dorn . |
| 4,411,481 | 10/1983 | Berkman . |
| 4,523,768 | 6/1985 | Dlubala ............................ 211/195 X |
| 4,592,600 | 6/1986 | Bohnet et al. . |
| 4,647,118 | 3/1987 | Kamperman . |
| 4,650,072 | 3/1987 | Ackeret . |
| 4,655,345 | 4/1987 | Drake et al. . |
| 4,657,146 | 4/1987 | Walters . |
| 4,700,849 | 10/1987 | Wagner ............................ 211/113 X |

FOREIGN PATENT DOCUMENTS

| | | |
|---|---|---|
| 1255724 | 6/1961 | France . |
| 2428299 | 4/1980 | France . |
| WO81/02829 | 10/1981 | PCT Int'l Appl. . |
| 350090 | 12/1960 | Switzerland . |
| 742808 | 1/1956 | United Kingdom .................. 211/40 |

Primary Examiner—Sarah A. Lechok
Attorney, Agent, or Firm—Varnum, Riddering, Schmidt & Howlett

[57] ABSTRACT

A storage rack assembly for storing articles such as audio and video cassettes, compact disc containers and records on shelves, cabinets and the like includes a rack formed of a base and U-shaped wires which form side supports, a base formed of elongated wires and mounting the U-shaped wires and cross-wires which form supports for the articles. A track slidably mounts the rack for sliding movement with the rack mountable on a shelf or in a cabinet. The rack and track are constructed to a size to conform to the particular articles. In a cassette and disc-container holder, the U-shaped wires are mounted at an oblique angle to each other so that the back legs of the wires form stops for the cassettes or disc containers which lie flat on the cross-wires with the cassettes or disc containers extending out from the front legs of the U-shaped wires. In a record album and storage rack, the U-shaped wires are mounted parallel to each other and the cross-wires have lips at the front portion thereof to retain the record albums in vertical orientation. Back retainer wires are provided at the upper and lower portions of the U-shaped wires to retain the records. A knockdown embodiment comprises U-shaped wires with laterally-extending feet which fit within channels in a base, which in turn is slidable within a track. The rack and the track can be mounted in an upright position or in an inverted position whereby the rack is suspended from the track. In the inverted position, article support wires are mounted to the lower portions of vertically oriented wires to support the cassettes or disc containers.

16 Claims, 10 Drawing Sheets

U.S. Patent  Dec. 19, 1989  Sheet 1 of 10  4,887,725
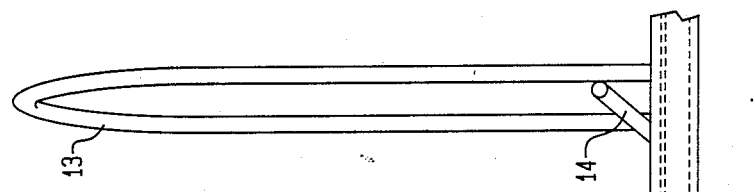
FIG. 2
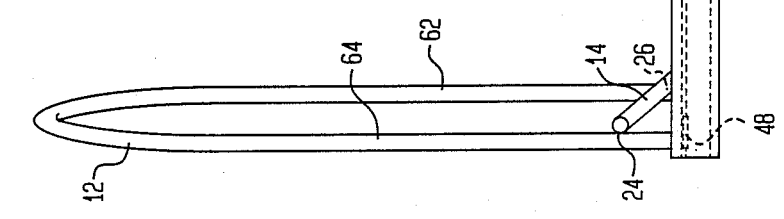
FIG. 1
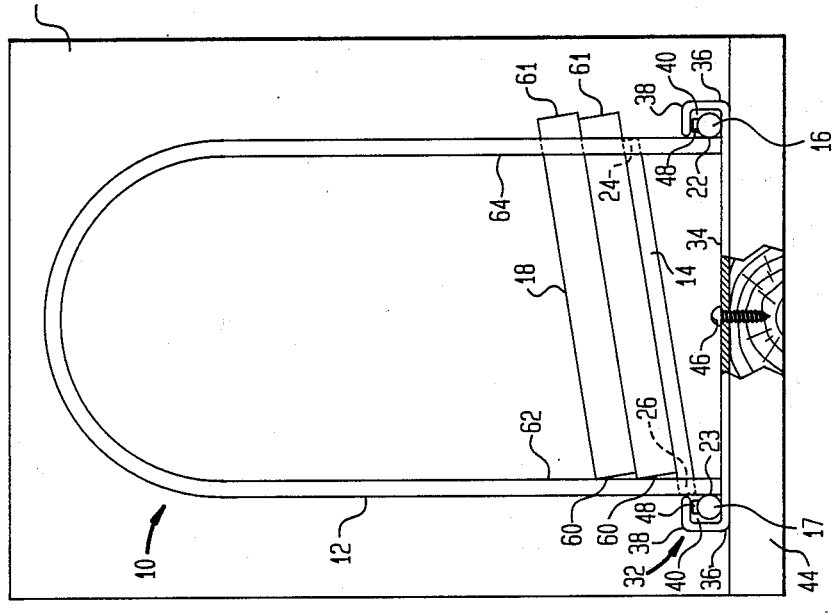

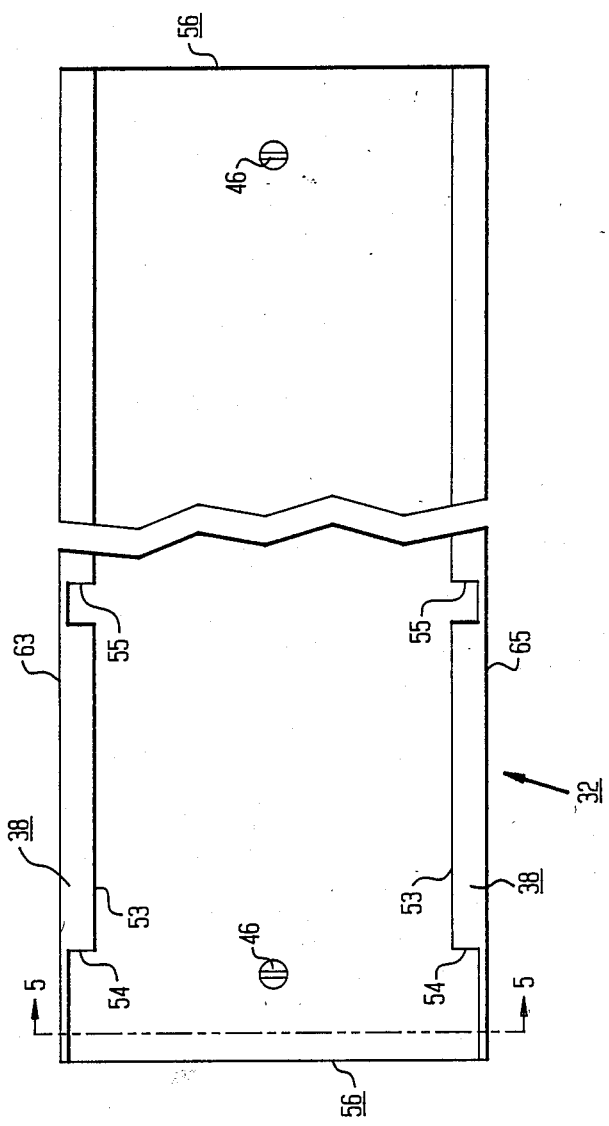

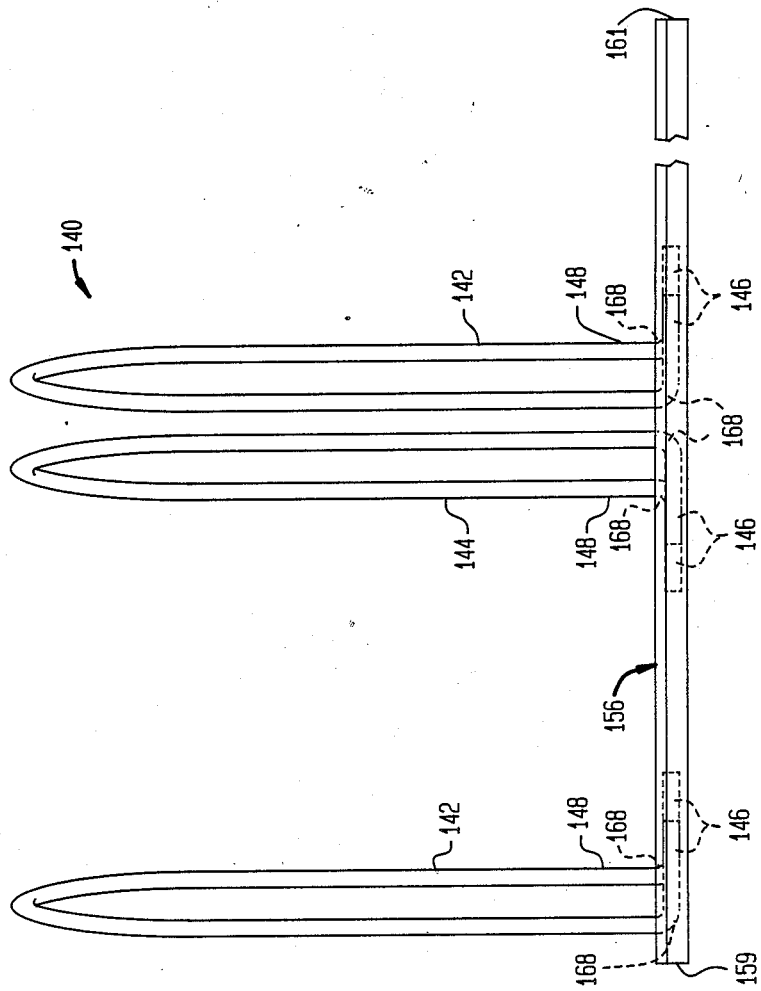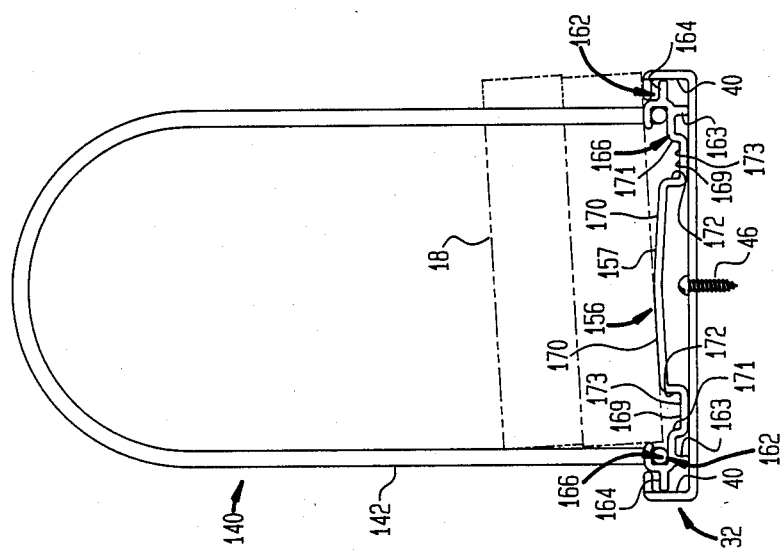

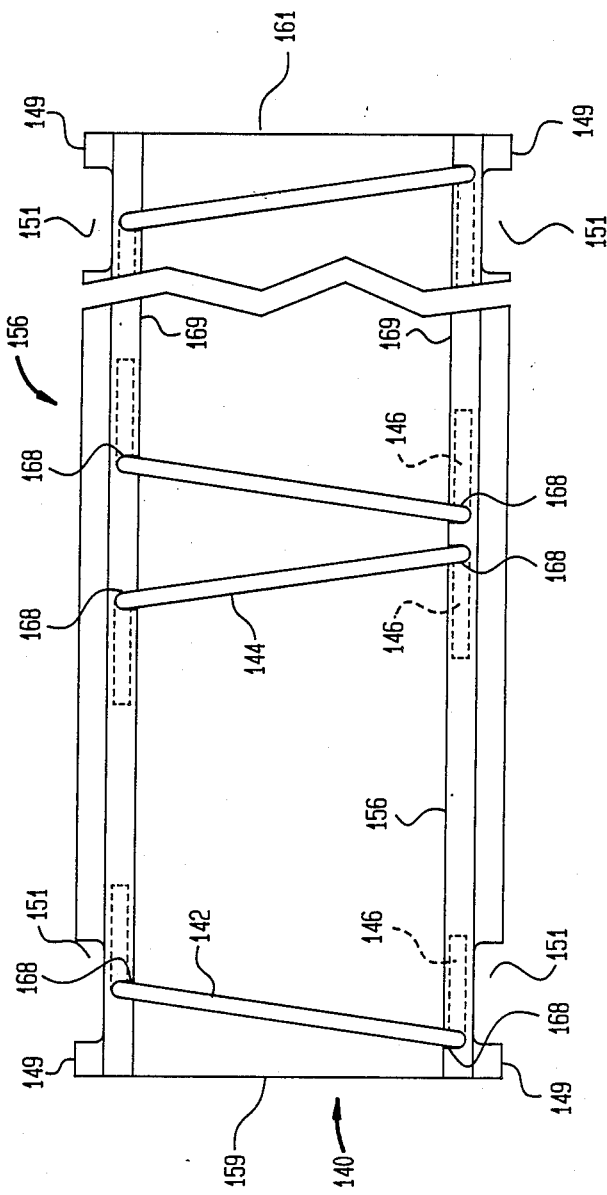

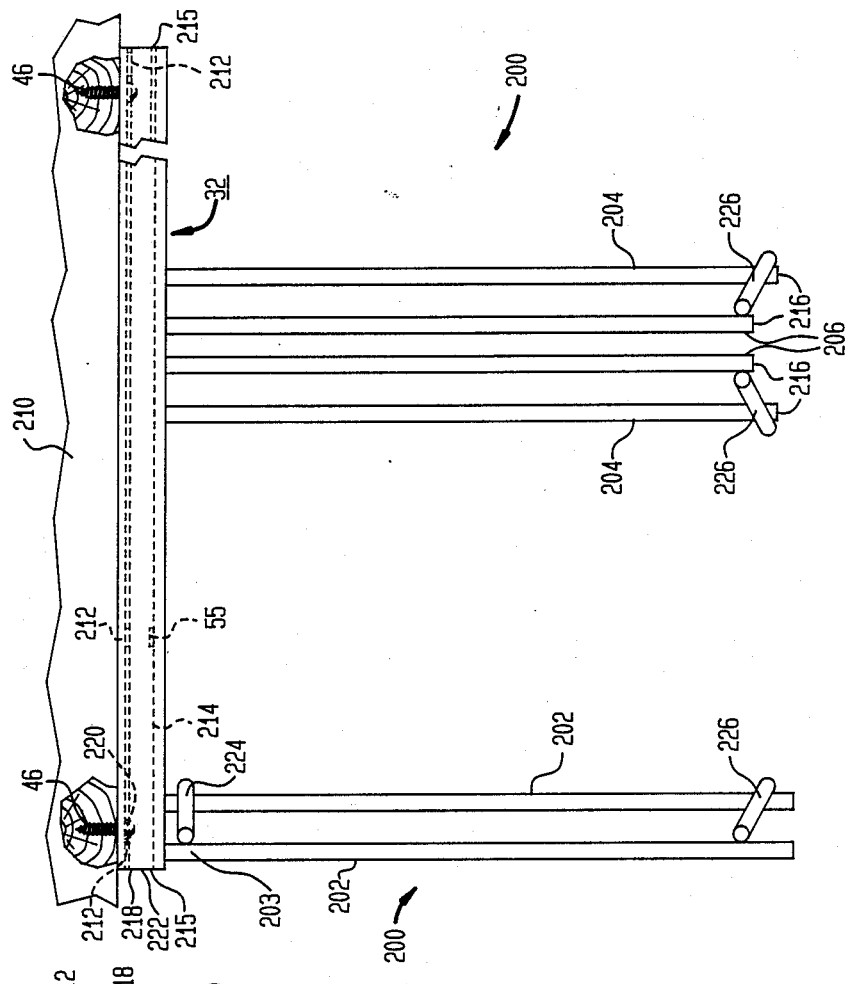
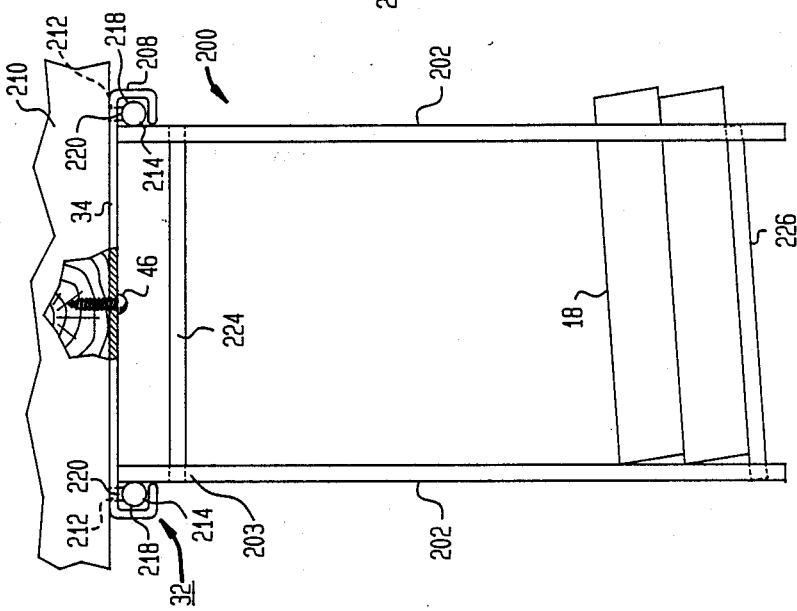

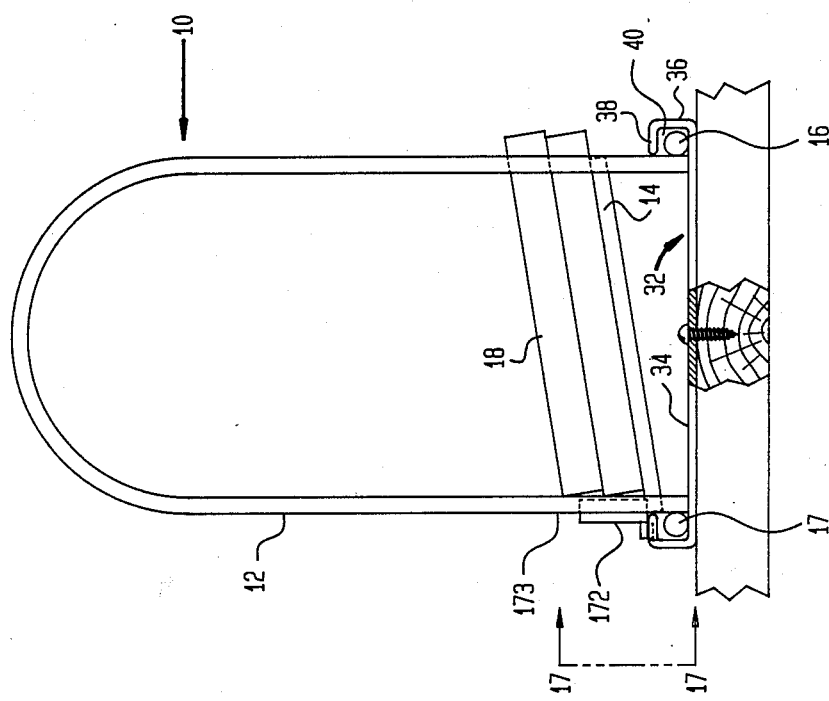

STORAGE RACK ASSEMBLY

BACKGROUND OF THE INVENTION

1. Field of the Invention

This invention relates to storing cassettes, compact discs and LP records on shelves, in a space-efficient manner, yet for easy access, with visibility of the stored articles and in equipment which is attractive and unobtrusive.

2. State of the Prior Art

Many devices have been developed to store audio cassettes, These devices are characterized by inefficient use of space, unattractive features, poor visibility of stored articles, difficulty of placing the articles into the storage devices and removing the articles therefrom and relatively low cost-effective storage. For example, one cassette storage device is formed of a wire basket and slides within a wire cage. Tape cassettes are stored in vertical orientation with the basket, making the tapes rather difficult to see, difficult to place within the basket and difficult to remove from the basket. The cage makes the entire device relatively large and unattractive.

Other cassette storage devices include boxes in which cassettes are stored in vertical orientation in spaced-apart relationship and racks wherein the cassettes are mounted in horizontal orientation but within or protruding slightly from an enclosure. These devices typically result in difficulty in positioning the cassettes within the housing as well as removing the cassettes from the housing.

The Drake et al U.S. Pat. No. 4,655,345, issued Apr. 7, 1987, discloses a compact disc storage unit. The unit comprises an outer housing and a plurality of slots located on the upper and lower surfaces of the housing interior. These slots are used to store a plurality of compact discs in a vertical face-to-face orientation. A raised central portion located on the upper outside surface of a lower housing connects to rests located on the bottom surface of an upper housing to vertically stack a plurality of housings. Compact discs are placed on slidable members for loading into the unit. A handle on the housing permits transportation of the storage unit.

The Ackeret U.S. Pat. No. 4,650,072, issued Mar. 17, 1987, discloses an audio cassette storage magazine which is comprised of a solid outer housing in which is located a plurality of half-housings which are vertically stacked in horizontal orientation within the outer housing. Tapes are stored horizontally within the half-housings. By opening a door located on each half-housing, a slider on which the tapes rest is partially ejected for ease of tape removal. The outer housing is fixedly mounted by a yoke to a surface underneath a dashboard in the interior of an automobile.

The Kamperman U.S. Pat. No. 4,647,118, issued Mar. 3, 1987, discloses a plurality of tape, disc and record storage boxes comprised of solid walls and a door. When the door is placed in an open position, the contents, which are stored in a vertical orientation, are partially withdrawn by a slide mechanism attached to the door. A plurality of storage boxes can be vertically and/or horizontally interlocked by slides and channel means located on the outside surface of the boxes.

The Bohnet et al U.S. Pat. No. 4,592,600, issued June 3, 1986, discloses stackable video and audio cassette storage boxes with various means to indicate when a cassette is in each box. In one embodiment of the invention, a storage box has a plurality of cassettes which are stacked horizontally in drawers located within the storage box.

The Kersting U.S. Pat. No. 3,114,459, issued Dec. 17, 1963, discloses in relevant part a wire frame for record storage wherein the records are stored in a face-to-face manner. The wire frame is mounted to a shelf through conventional U-shaped drawer glides which are mounted to the shelf and to the wire rack. A stop mechanism is provided by a small rod inserted during assembly into apertures located in the rear portion of each frame drawer glider. The frame motion will stop when the rod comes into contact with the bottom drawer glide. Rearward motion of the frame is stopped by the engagement of bends located at the lower front portion of the wire frame side member with the stationary lower drawer glide.

The Dorn U.S. Pat. No. 3,800,958, issued Apr. 2, 1974, discloses a rectangular wire frame used for book storage. A single length of wire forms the frame legs, ends, risers and side bar portion. Horizontally spaced longitudinal bars are positioned between the ends and parallel to the side bar. When placed in service, the side bar is at a lower elevation than the uppermost portion of the legs thereby causing the plane on which the books rest to be inclined. The side bar provides a stop means for book placement. V-shaped wires which hook around the longitudinal wires are connected by springs and are used as bookends to hold the books in place. Multiple sets of V-shaped wire bookends may be placed on the frame to accommodate multiple series of books.

The Frey U.S. Pat. No. 3,347,393, issued Oct. 17, 1967, discloses a record storage rack comprised of a wire frame which has a removable U-shaped record support member which holds record covers. Record covers are placed on the U-shaped member by inserting the legs of the U-shaped member through holes punched in the rear portion of the record covers. The base of the wire frame is inclined rearwardly and downwardly so records do not unintentionally slide out of the covers. A V-shaped fitting can be attached to the legs of the U-shaped member to hold the record covers in a compressed position.

The Cavanagh U.S. Pat. No. 3,318,453, issued May 9, 1967, discloses a file holder that is comprised of a wire frame. The frame consists of a single wire that is bent to form two U-shaped end portions and two longitudinal support wire portions. Files are placed within the frame for ease of transporting the files.

The Huff U.S. Pat. No. 2,892,548, issued June 30, 1959, discloses a collapsible record storage rack. The rack comprises a plurality of inverted U-shaped wires mounted on channel-shaped side holders. A base portion comprised of longitudinal and cross-wires is inserted into or removed from the channel-shaped side holders by pulling the side holders laterally apart and pressing the base into place in the side holders.

The VonMeyer U.S. Pat. No. 2,959,293, issued Nov. 8, 1960, discloses a record storage rack that is comprised of two end members held together by two longitudinal rods. The rods are spaced a predetermined vertical and horizontal distance apart. The records sit vertically face-to-face on the rods. The end pieces are then moved to a position adjacent to the record jackets to hold the records in place.

The Gutierrez U.S. Pat. No. 3,446,360, issued May 27, 1969, discloses a boxlike frame used for record storage. Pivotally mounted transverse slotted record-holding members are located in the box. Records are placed in the slotted portion of the record holders for storage.

SUMMARY OF THE INVENTION

According to the invention, there is provided a storage rack assembly for storing articles such as cassettes, disc containers and records on shelves, cabinets and the like in such a manner that the articles can be stored efficiently on the shelf and yet be accessible when needed, easily visible so that a particular cassette, disc or record can be selected and can be easily positioned within the storage rack or removed from the storage rack. In accordance with the invention, a rack comprises a base, an article support means and at least one pair of side retainer means with the side retainer means being mounted to the base, substantially perpendicular thereto and spaced apart a distance to conform substantially to the width of the article to be stored. The rack has an open front to permit the article to pass therethrough but in close proximity to the side retainer means so that a number of the articles can be retained therein. The article support means provides support for at least one of the articles positioned between the pair of said retainer means. An elongated track means mounts the rack for sliding movement generally parallel to the open front and generally perpendicular to the side retainer means. The rack thus can be moved along the track to present the open front for access to one article when the track is mounted on the shelf or in a cabinet.

In one embodiment, the base comprises elongated wires and the side retainers comprise a wire form, preferably of U-shaped configuration, having legs mounted to the base at end portions thereof. Further, the article support means comprises wire elements mounted to end portions of the leg near the base for supporting the articles.

Preferably, the wire elements are mounted at an acute angle to a horizontal plane of the base and extend upwardly from a back portion of the rack to a front portion thereof whereby the articles lying flat on the wire elements are positioned at an acute angle to the horizontal plane of the base.

In another embodiment of the invention, the article support means comprise wire elements mounted to the lower portion of vertical wires to support articles when the longitudinal track means is mounted to the underside of a shelf or other support and the rack is suspended from the elongated track means. In this embodiment, the wire elements are also preferably mounted at an acute angle to the plane of the base from a back portion of the rack to the open front portion thereof whereby the articles, lying flat on the wire elements, are positioned at an acute angle to the horizontal plane of the base.

In one embodiment of the invention for supporting cassettes and disc containers, U-shaped wires form the side retainer means and are mounted at an oblique angle with respect to each other so that the spacing between the back legs of the U-shaped wires at a back portion of the rack are less than the width of the article whereby the article in a stored orientation abuts the U-shaped back legs at a back portion of the rack. The spacing between the legs of each of the U-shaped wires is preferably less than the length of the articles so that the articles in stored orientation within the rack and resting against the back legs of the U-shaped wires project outwardly past the front legs of the U-shaped wires for ease of removal of the articles from within the rack and of placement of the articles into the rack. The back portions of the legs thus provide a retainer means at a back portion of the rack to retain the articles to prevent the articles in a stored orientation from passing through a back portion of the rack.

In another embodiment of the invention for storing LP record albums, a back retainer means is provided at upper and lower portions of the retainer means or wires and extends across the back portion of the rack to retain the record albums standing on end and on the wire element article support means. The wire element article support means preferably have a lip at a front portion thereof to retain the LP record albums thereon.

In still another embodiment of the invention, the side retainer means comprises wire forms, typically U-shaped wires, having a pair of legs, each of which has laterally-extending feet. The base comprises an elongated support member having means to releasably retain the feet in the elongated support member in perpendicular relationship to the elongated support member. The means to releasably retain the feet comprise channels having an open side for receipt of the feet.

The base is preferably an extruded shape with an elongated central portion and elongated inwardly-facing channels at the sides thereof. The base further has laterally-projecting flanges which are received within the track channels.

The track means typically has an elongated flat central portion and inwardly-opening channels at the sides thereof to receive the base of the rack in sliding relationship thereto. Conveniently, the track can be made of an extruded plastic material.

In addition, the track means channels preferably have openings at the ends thereof to facilitate entry of the base into the track means or removal of the base from the track means.

A stop means is preferably provided between the track means and the rack to releasably retain the base of the rack within the track when the base is positioned in an extending, telescoping relationship with the track. The stop means is preferably positioned on one end of the track and on each end of the base so that the base is releasably retained in the track when the base is in an extended telescoping relationship regardless of which end of the base was initially inserted into the track.

In one embodiment, the stop means comprises a protrusion on the end of the base, typically elongated wires, and an opening in an upper portion of the channel. In another embodiment, the stop means comprises a notch and tab located at the end of an extended plastic base, and an opening in the upper portion of the track channel. In another embodiment, the stop means comprises a spring clip having a spring stop bearing against the upper portion of the track channels and an opening in the track channels in registry with the spring stop. The track means preferably has a means, such as a screw, for securing the track to a support.

The rack can be used without the track for article storage. A freestanding rack can be set on a shelf or table top and filled with articles.

BRIEF DESCRIPTION OF THE DRAWINGS

The invention will now be described with reference to the accompanying drawings in which:

FIG. 1 is a side elevational view of a video cassette storage rack assembly constructed in accordance with the invention;

FIG. 2 is a front elevational view of the video cassette storage rack assembly shown in FIG. 1;

FIG. 4 is a plan view of the track of the video cassette storage rack assembly shown in FIGS. 1 and 2;

FIG. 5 is a cross-sectional view taken along lines 5—5 of FIG. 4;

FIG. 9 is a side elevational view of the knockdown version storage rack assembly illustrating another embodiment of the invention;

FIG. 10 is a front elevational view of the knockdown version storage rack assembly shown in FIG. 9;

FIG. 11 is a plan view of the knockdown version storage rack and base of the assembly shown in FIGS. 9 and 10;

FIG. 13 is a side elevational view of the storage rack assembly illustrating another embodiment of the invention;

FIG. 15 is a front elevational view of the storage rack assembly shown in FIG. 13;

FIG. 16 is a side elevational view illustrating another embodiment of the stop means of the invention;

FIG. 17 is a partial elevational view taken along lines 17—17 of FIG. 16.

DETAILED DESCRIPTION OF THE PREFERRED EMBODIMENTS

Cassette And Disc Container Embodiment

Figure 3:
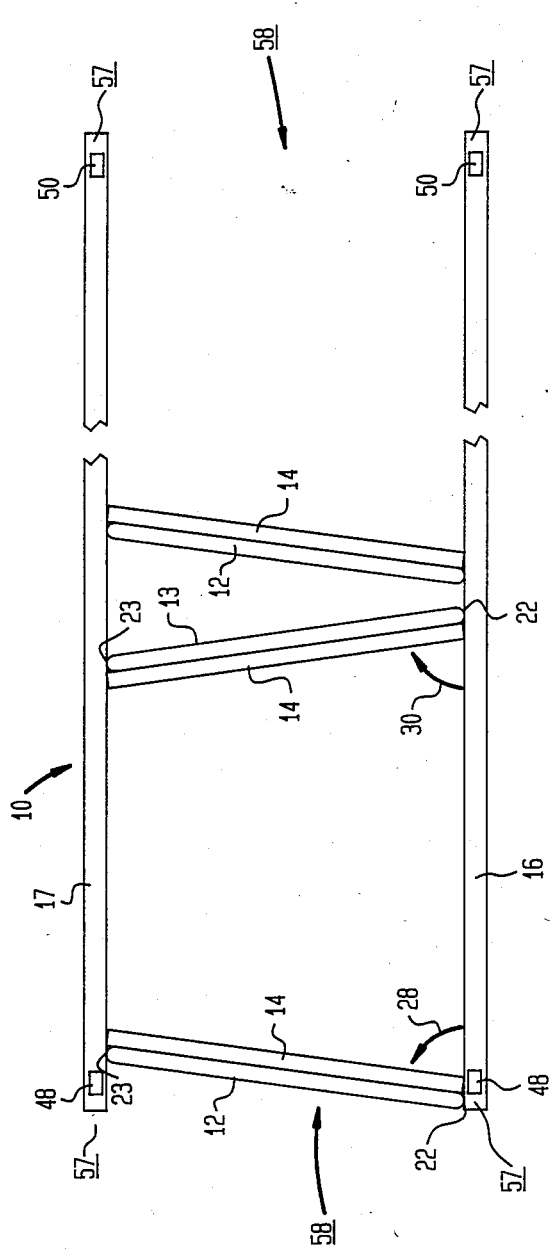
FIG. 3 is a plan view of the video cassette storage rack portion of the assembly shown in FIGS. 1 and 2.

Referring now to the drawings in detail and in particular to FIGS. 1-3, there is shown a storage rack 10 having a plurality of sets of U-shaped wires 12, 13 attached to cross-wires 14 and longitudinal wires 16, 17. For all embodiments described herein, like numerals refer to identical elements. Also, all longitudinal wires, regardless of numerical designation, are elongated. The rack 10 is constructed so it can support a plurality of articles 18 such as video or audio cassettes, or compact disc containers. For convenience in understanding the invention, each adjacent pair of U-shaped wires 12, 13 will be hereinafter referred to as a set of wires. Although only one set of U-shaped wires 12, 13 are shown, it is understood that several such sets of U-shaped wires are appropriately spaced along the wires 16 and 17 to provide several bays wherein multiple articles can be stored. For all embodiments, each set of U-shaped wires serves as a side retainer means for the invention. For the cassette and disc container embodiment, the longitudinal wires 16, 17 may be characterized as the base for the rack 10.

Each set of U-shaped wires 12, 13 are rigidly secured as by welding to a front longitudinal wire 16 and a rear longitudinal wire 17 at each interface 22, 23 between the U-shaped wires 12, 13 and the longitudinal wires 16, 17.

Each cross wire 14 is rigidly secured as by welding to the U-shaped wires 12, 13 at each frontal interface 24 and rear interface 26 between the cross wire 14 and U-shaped wires 12, 13. Each cross wire 14 is mounted at a slight angle to the horizontal so the front interface 24 is elevated above the rear interface 26. For all embodiments, the cross-wires serve as article support means for the invention.

Each set of U-shaped wires 12, 13 are mounted at opposing acute angles 28, 30 to the front longitudinal wire 16 so that the distance between U-shaped wires 12, 13 at the front longitudinal wire 16 is greater than the distance between the U-shaped wires 12, 13 at the rear longitudinal wire 17, as shown in FIG. 3.

As illustrated in FIG. 1, articles 18 are inserted by placing them on the cross wires 14. The rear edges 60 of the articles rest against the rear portion 62 of the U-shaped wires 12, 13. The front edges 61 of the articles 18 extend alongside the front portion 64 of the U-shaped wires 12, 13 because of the spread of the U-shaped wires 12, 13 from the rear portion 62 to the front portion 64. The space defined by the front portion 64 of the U-shaped wires 12, 13 and the front longitudinal wire 16 may be characterized as an open front of the rack.

As shown in FIG. 1, the storage rack 10 is slidably mounted in an elongated track 32. The track 32 comprises a flat central portion 34 and two channels formed at each side thereof by side portions 36 and upper flanges 38. The L-shaped portions form channels 40 in which slide the longitudinal wires 16, 17. The channels 40 thus form a means for mounting the rack 10 to the track 32. The mounting of the rack 10 in the track 32 permits the rack 10 to be stored within a cabinet 42 and yet withdrawn for access to the articles 18. The track 32 can be mounted to the top of a shelf or a cabinet base 44 by means of a screw 46 located near each end of the track 32. Articles 18 are stored horizontally, so their titles, which are located on the front edge 61 of each article 18, are readily visible when the rack 10 is withdrawn from the track 32.

There are notches 54 that are located on the upper flanges 38 at an outer edge 56 of the track 32. The notches 54 are used to facilitate placement of the rack 10 into the track 32. The rack 10 is inserted into the track 32 by first placing an end portion 57 of each longitudinal wire 16, 17 on the track central portion 34 at the notches 54. The longitudinal wires 16, 17 are then inserted within the channels 40. The corresponding end portions 57 at each end of the longitudinal wires 16, 17 may be characterized as an end 58 of the rack 10.

FIGS. 1 and 3 illustrate vertical protrusions 48, 50 which are formed as by a stamping operation on the longitudinal wires 16, 17. The upper flange 38 of each track channel 40 has an inner notch 55 located near the outer edge 53 as shown in FIG. 4. As the rack 10 is drawn along the track 32, the weight of the portion of the rack 10 removed from tract 32 causes the upper edge of the longitudinal wires 16, 17 to ride against the underside of the upper flange 38. When the rear vertical protrusions 50 engage the notches 55, further movement of the rack 10 is prevented. To completely remove the rack 10, the end 58 of the rack 10 withdrawn from the track 32 is lifted so that the rear vertical protrusions 50 disengage from the notches 55. The placement of the rack 10 into the track 32 is nonhanded. That is, either end 58 may be inserted into the track 32. This non-handedness permits articles 8 to be placed into the rack 10 from either track lateral side 63 or 65. The notches 54 of track 32 typically face the front edge of the shelf 44. The non-handedness of the rack 10 permits insertion and removal of articles 18 from rack 10 in the event the track 32 is placed adjacent to a vertical wall (not shown) on or near the shelf 44. For example, if there is a vertical wall adjacent to lateral side 65, the rack 10 may be inserted into the track 32 so articles 18 are inserted and removed from track side 63 even if rack 10 is not withdrawn from the track 32.

The storage rack 10 can be conveniently used to store video cassettes, audio cassettes and compact disc containers. The spacing between the U-shaped wires 12 and 13 and the width of the rack 10 are selected to fit the particular side of the articles. Otherwise, the structure is the same for all three articles.

Long Playing Record Embodiment

Figure 7:
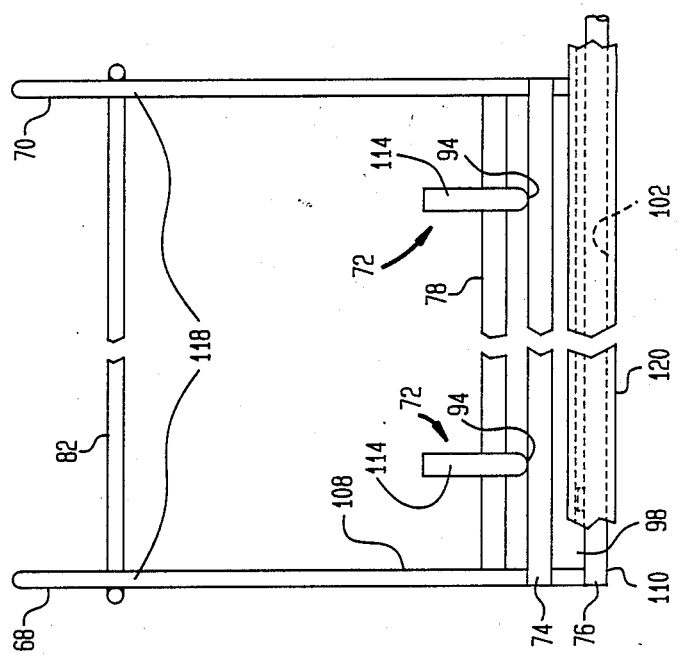
FIG. 7 is a front elevational view of the long playing record storage rack assembly shown in FIG. 6.
Figure 6:
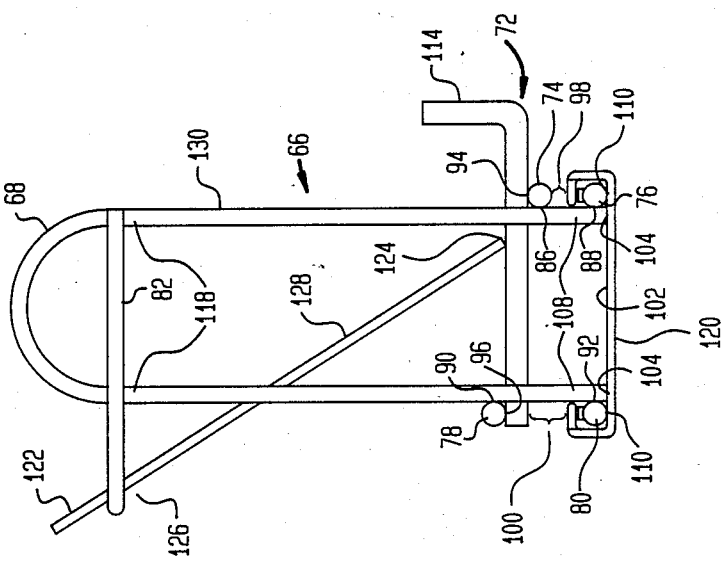
FIG. 6 is a side elevational view of a long playing record storage rack assembly constructed in accordance with the invention.
Figure 8:
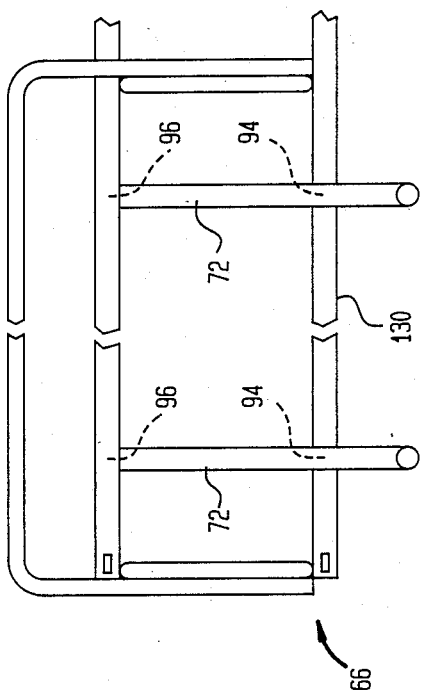
FIG. 8 is a plan view of the long playing record storage rack portion of the assembly shown in FIGS. 6 and 7.
Figure 14:
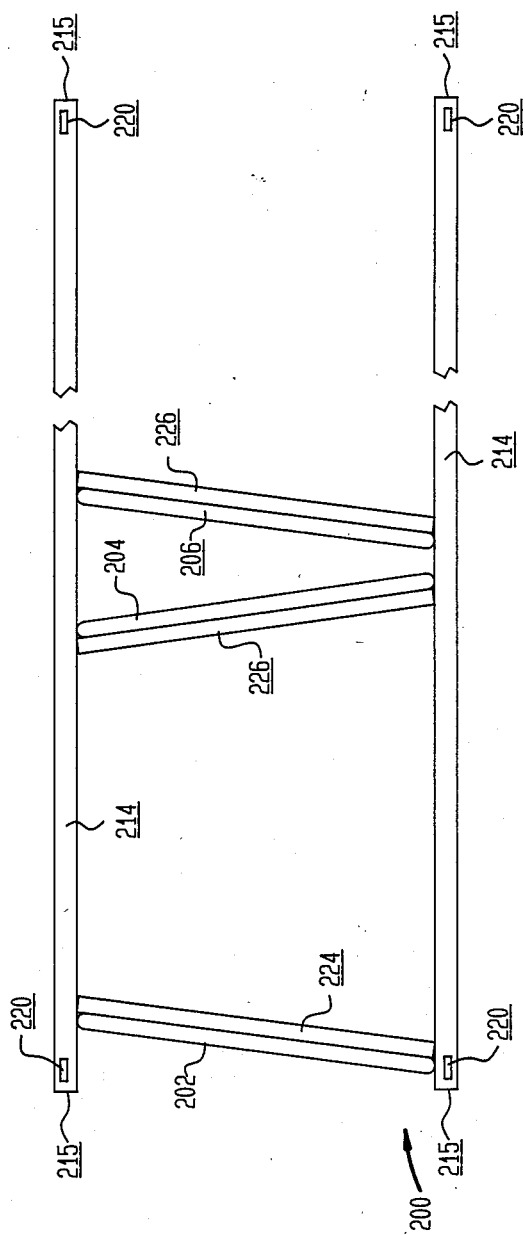
FIG. 14 is a plan view of the storage rack portion of the assembly shown in FIG. 13.

An embodiment which is used for the storage of long playing records is shown in FIGS. 6-8. In this embodiment, there is a rack 66 having a plurality of vertically oriented U-shaped wires 68, 70 attached to cross-wires 72 and longitudinal wires 74, 76, 78, 80. An upper U-shaped wire 82 is horizontally oriented and attached to the upper portion 118 of each leg of the vertically oriented U-shaped wires 68, 70. For convenience in understanding the invention, only one pair of vertically oriented U-shaped wires 68, 70 will be described. Although only one set of U-shaped wires 68 and 70 are shown in FIGS. 6-8, it is understood that one or more sets of such wires can be mounted on the wires 76 and 80 so that one or more bays can be provided for storage of such records.

Referring now to FIGS. 6 and 7, each set of U-shaped wires 68, 70 are rigidly secured as by welding to the longitudinal wires 74, 76, 78, 80 at each interface 86, 88, 90, 92 with the U-shaped wires 68, 70 and the longitudinal wires 74, 76, 78, 80.

As FIG. 6 illustrates, there is a vertical space 98 between the upper front longitudinal wire 74 and the lower front longitudinal wire 76. There is also a vertical space 100 between the upper rear longitudinal wire 78 and the lower rear longitudinal wire 80. The space 100 is a predetermined size larger than space 98. The spaces 98, 100 are dimensioned so that the cross-wires 72 are parallel to a bottom plane 102 formed by the central portion of a track 120.

The lower longitudinal wires 76, 80 are positioned on the lower portion 108 of the U-shaped wires 68, 70 so that the bottom surface 110 of each longitudinal wire 76, 80 is flush with each bottom edge 104 of the U-shaped wires 68, 70 as shown in FIGS. 6 and 7. For the long playing record embodiment, the lower longitudinal wires 76, 80 may be characterized as a base for the rack 66.

Each cross-wire 72 is spaced inwardly from adjacent U-shaped wires 68 and 70. Each cross-wire 72 is rigidly secured as by welding to the longitudinal wires 74, 78 at the interface 94 located on the upper portion of longitudinal wire 74, and at the interface 96 located on the lower portion of longitudinal wire 78. As illustrated in FIG. 6, the front portion 114 of each cross-wire 72 is bent upwardly to form a lip to retain records.

The horizontally oriented U-shaped wire 82 is rigidly secured as by welding to the upper portion 118 of the vertically oriented U-shaped wires 68, 70. The horizontally oriented U-shaped wire 82 serves as an upper back retainer means for the invention. The longitudinal wire 78 serves as a lower back retainer means for the invention.

The record storage rack 66 is mounted in an elongated track 120. This track is similar in construction and operation to the track 32 described for the storage rack 10. As with the storage rack 10, the lower longitudinal wires 76, 80 have vertical protrusions which operate in conjunction with notches in the track 120. This stop means is used to prevent further movement of the rack 66 after it is partially withdrawn from the track 120. The track has screws (not shown) similar to screws 46 for mounting the track 120 on the upper surface of a shelf or cabinet.

Referring to FIG. 6, long playing records 122 are inserted by placing them within a set of vertically oriented U-shaped wires 68, 70. The bottom edge 124 of each record rests on the cross-wires 72. The horizontally oriented U-shaped wire 82 holds the upper portion 126 of each record in place. The records are typically inserted so the forward face 128 of each record faces the forward portion 130 of the rack 66.

Knockdown Embodiment

A knockdown version of the tape/disc/record storage rack concept is shown in FIGS. 9–12. For illustrative purposes, a knockdown version of a cassette or disc container rack is shown. In this embodiment, the storage rack 140 has vertically oriented U-shaped wires 142, 144.

For convenience in understanding the invention, only one set of adjacent U-shaped wires 142, 144 will be described although it should be understood that multiple sets of such U-shaped wires 142 and 144 can be used on each storage rack 140. Each U-shaped wire 142, 144 has an inward facing L-shaped foot portion 146 located at the lower portion 148 of each U-shaped wire 142, 144.

The track 32 shown in FIGS. 4 and 5 is used with this embodiment. The track 32 is secured to a shelf (not shown) by means of a screw 46 located near each end 56 of the track 32.

Figure 12:
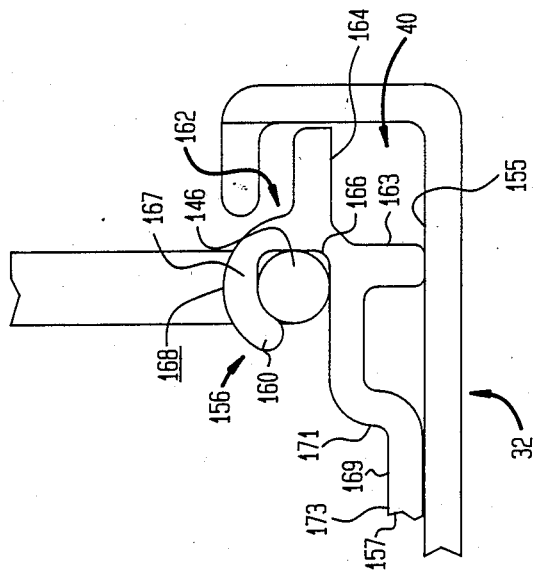
FIG. 12 is an enlarged fragmentary side elevational view of the knockdown version storage rack assembly shown in FIG. 9 and showing the outer edge portions of the base and track.

Inserted in the track channels 40 is a rack base 156. As illustrated in FIGS. 9 and 12, the base has a central portion 157 and two bilateral transverse edge portions 162. A downwardly projecting flange 163 located at each edge portion 162 slides along a surface 155 of the track 32 for insertion and removal of the rack 140 from the track 32. An outwardly projecting flange 164 located at each edge portion 162 holds the base within the track 32. Each flange 164 has a notch 151 and a tab portion 149 located at each edge 159, 161 as shown in FIG. 11. Inward-facing channels 166 located at the transverse edge portions 162 are formed from return flanges 167 and receive the U-shaped wires 142, 144 to the base 156 as will now be described. Each flange 167 has a downwardly-projecting lip 160 on the end thereof.

As shown in FIG. 9, the base central portion 157 comprises two bilateral channel portions 169 and canted portions 170. The channel portions 169 comprise an outer wall 171, and inner wall 172 and a web portion 173. The inner wall 172 extends a predetermined vertical distance further than wall 171. The web portion 173 is flush with the lower edge of the flange 163. The canted portions 170 slope upwardly toward the center of the base central portion 157.

The knockdown embodiment 140 is assembled by inserting the L-shaped foot portion 146 at each end of the U-shaped wires 142, 144 into the inwardly facing base channels 166 located on the base 156 as shown in FIGS. 10 to 12. The size of the channel interior cross-section is approximately the same size as the diameter of the U-shaped wires 142, 144. The legs of the U-shaped wires 142, 144 are inserted into notches 168 which are located on the upper return flanges 167 of each channel 166. The lip 160 on the upper return flange portion 167 retains the U-shaped wire feet 146 in the channels 166 so that the U-shaped wires 142, 144 are retained in a vertical orientation with respect to the rack base 156. The base 156 can be made of a resilient plastic material so that the channels 166 resiliently flex like a spring to receive the feet 146 and to retain the feet 146 in place. The knockdown embodiment is disassembled by removing the U-shaped wires 142, 144 from the channels 166. Alternatively, the U-shaped wires 142, 144 can be made from a spring-like material and spring to a position wider than the distance between the channels 166. Thus, the spring biasing of the legs of the wires 192, 144 can retain the wires firmly seated in the channels 166.

The notches 151 and tabs 149 of the base 156, and the notches 55 of the track 32 form a partial stop means for removal of the rack 140 from the track 32. For illustrative purposes, assume the rack 140 is withdrawn in a direction toward end edge 56 of the track 32. Assume further that end edge 159 of base 156 is withdrawn first. As the outer flange portions 149 that are adjacent to base end edge 161 come into contact with track notches 54 that are adjacent to track end edge 56, the weight of the portion of the rack 140 withdrawn from the track forces each flange portion 149 to engage a respective notch 55. This engagement prevents further withdrawal of the rack until the edge 159 is raised vertically to disengage the flange portions 149 from the notches 55.

The base 156 is non-handed with respect to the stop means. That is, either edge 159 or 161 may be inserted into track 32. This non-handedness permits articles to be selectively inserted into the rack 140 from either track lateral side 63 or 65. The non-handedness qualities are similar to those already described for storage rack 10. Notches 151 and tabs 149 are located at each end of flanges 164. Thus, a stop means is provided for the invention regardless of the orientation of edges 159 and 161 with the track 32.

Undershelf Embodiment

FIGS. 13 and 15 illustrate an embodiment that discloses a storage rack 200 that is used with a track 32 which is fastened to the bottom face of a shelf 210. In this embodiment, the storage rack 200 is inverted as compared to the storage rack 10 and comprises a plurality of vertical wires 202, 204, 206 that are securely fastened as by welding to longitudinal wires 214 and cross-wires 224, 226. The vertical wires 202 are located at the rack ends 222 and extend a predetermined length longer than the wires 204 and 206. The length of wires 202 allow them to serve as support legs for the rack 200 so it can be placed in a freestanding position on a tabletop or similar surface when the rack 200 is removed from the track 32. The cross-wires 224 are secured to the upper portion 203 of wires 202 to provide structural spacing for the wires 202.

The vertical wires 204 extend a predetermined length further than vertical wires 206. The cross-wires 226 are fastened so they are flush with the bottom edges 216 of wires 204 and 206. The cross-wires 226 that are attached to the vertical wires 202 are positioned so they are coplanar with the wires 226 that are fastened to wires 204 and 206. The cross-wires 226 support the stored articles.

Protrusions 220 are located on the upper portion 218 near both ends 215 of each longitudinal wires 214. The protrusions 220 provide a similar stop means as described for the cassette and disc container embodiment. Because the track 32 is mounted to the underside of the shelf, notches 212 are located on the track flat central portion 34 opposite the notches 55 to form part of the stop means.

An alternative embodiment for the inverted storage rack 200 can use U-shaped wires with a square bight portion to permit the rack 200 to be placed on a tabletop in a freestanding position in lieu of the vertical wires 204.

The operation of the inverted storage rack 200 is similar to the storage rack 10 except that the cassettes 18 rest on the cross-wires 218 and the protrusions 220 engage the notches 212 in the track when the rack is in telescoping relationship to the track 32.

Spring Indent Stop Alternative

An alternate stop mechanism for the storage rack is illustrated in FIGS. 16 and 17. The spring indent 270 can replace the protrusion/notch means described above with reference to FIGS. 1-5.

As seen in FIGS. 16 and 17, a spring indent 270 attaches by a sleeve portion 272 to the lower portion 273 of a U-shaped wire 12 of the storage rack 10. The wire 12 is typically the innermost U-shaped wire when the rack 10 is placed in a track 32. That is, the wire 12 is the last one to be withdrawn from the track 32. A notch 55 is located in the track upper flange 38 in registry with a V-shaped portion 274 of the spring indent 170.

As the rack 10 is withdrawn by sliding along the track 32 the V-shaped portion 274 of the spring indent 170 engages the notch 55. Further movement is prevented until the rack 10 is lifted so the spring indent 170 disengages from the notch 55.

Whereas the invention has been described with reference to a track and a rack combination, the rack design for all embodiments permits the rack to be used for article storage without use of the track. The base allows a freestanding rack to be placed on the tabletop for storing articles. In the undershelf embodiment, a freestanding rack 200 can rest on the bottom of vertical wires 204.

Tracks of identical dimensions can be used for the video cassette, audio disc, and long-playing record racks. A track of smaller dimensions can be used for the audio cassette embodiment.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. A storage rack assembly for storing articles such as cassettes, disc containers and records on shelves, in cabinets and the like, said storage rack assembly comprising:
   a rack comprising a rack means and article support means, said rack means comprising a base and at least one pair of side retainer means, said base including elongated wires, and each of said side retainer means comprising U-shaped wires having legs, end portions of which are mounted to said base, said side retainer means being substantially perpendicular to said base and spaced apart a distance to conform substantially to the width of an article of predetermined size, said rack having an open front to permit said article to pass therethrough but in close proximity to said side retainer means, and said article support means being mounted to said rack means to provide support for said article when said article is positioned between said one pair of said side retainer means; and elongated track means comprising mounting means for slidably mounting said rack to said track means for movement generally parallel to said open front and generally perpendicular to said side retainer means whereby said rack can be moved along said track to present the open front of said rack for access to said article; wherein said article support means comprises wire elements mounted to said legs and forming a bight portion of said U-shaped wires to support said article when said elongated track means is mounted to an underside of a support and said rack is suspended from said elongated track means.

2. A storage rack assembly according to claim 1 wherein said wire elements are mounted at an acute angle to a plane of said base from a back portion of said rack to said open front portion thereof whereby said articles, lying flat on said wire elements, are positioned at an acute angle to a horizontal plane of the base.

3. A storage rack assembly according to claim 2 wherein the U-shaped wires are mounted at an oblique angle with respect to each other so that the spacing between the back legs of the U-shaped wires at a back portion of the rack are less than the width of the article whereby the article in stored orientation abuts the U-shaped wires back legs at a back portion of the rack.

4. A storage rack assembly according to claim 3 wherein the spacing between the legs of each of the U-shaped wires is less than the length of the article so that the articles stored within the rack and resting against the back edge of the U-shaped wires project outwardly past front legs of the U-shaped wires for ease of removal of the articles from within the rack and of placement of the articles into the rack.

5. A storage rack assembly according to claim 1 wherein end ones of said retainer means have ends which extend down below said article support means to provide supports for said rack when said rack is removed from said track.

6. A storage rack assembly for storing articles such as cassettes, disc containers and records on shelves, in cabinets and the like, said storage rack assembly comprising:

a rack comprising a rack means and article support means, said rack means comprising a base and at least one pair of side retainer means, said side retainer means being mounted to said base substantially perpendicularly thereto and spaced apart a distance to conform substantially to the width of an article of predetermined size, said rack having an open front to permit said article to pass therethrough but in close proximity to said side retainer means, and said article support means being mounted to said rack means to provide support for said article when said article is positioned between said one pair of said side retainer means; and elongated track means comprising mounting means for slidably mounting said rack to said track means for movement generally parallel to said open front and generally perpendicular to said side retainer means whereby said rack can be moved along said track to present the open front of said rack for access to said article; wherein each of said legs has a laterally extending foot and said base comprises an elongated support member having means to releasably retain said feet in said elongated support member in generally perpendicular relationship to said elongated support member.

7. A storage rack assembly according to claim 1 wherein said means to releasably retain said feet comprise channels having an open side for receipt of said feet.

8. A storage rack assembly according to claim 7 wherein said channels have a lip on an end thereof to capture said feet and said channels are formed of a resilient material so that said channels hold said feet by spring action.

9. A storage rack assembly according to claim 1 and further comprising retainer means at a back portion of said rack to retain said articles in stored orientation from passing through a back portion of said rack in a given orientation.

10. A storage rack assembly according to claim 9 wherein said side retainer means has a width less than the length of said article so that said article stored within said rack and resting against said back portion retainer means projects outwardly past a front edge of said side retainer means for ease of removal of said article within said rack and for placement of said articles within said rack.

11. A storage rack assembly for storing articles such as cassettes, disc containers and records on shelves, in cabinets and the like, said storage rack assembly comprising:

a rack comprising a rack means and article support means, said rack means comprising a base and at least one pair of side retainer means, said side retainer means being mounted to said base substantially perpendicularly thereto and spaced apart a distance to conform substantially to the width of an article of predetermined size, said rack having an open front to permit said article to pass therethrough but in close proximity to said side retainer means, and said article support means being mounted to said rack means to provide support for said article when said article is positioned between said one pair of said side retainer means; and elongated track means comprising mounting means for slidably mounting said rack to said track means for movement generally parallel to said open front and generally perpendicular to said side retainer means whereby said rack can be moved along said track to present the open front of said rack for access to said article; wherein said elongated track means has an elongated flat central portion, and said mounting means comprises inwardly opening channels at the sides of the elongated flat central portion to receive said base in said track in sliding relationship thereto, and said track means channels have openings at the ends thereof to facilitate entry of said base into said track means and removal of said base from said track means, and said rack is symmetrical about a central transverse axis so that either end of said rack can be inserted into said track means channels with equal facility.

12. A storage rack assembly according to claim 11 and further comprising stop means between said track means and said rack to releasably retain said base within said track when said base is positioned in an extending, telescoping relationship of said track.

13. A storage rack assembly according to claim 12 wherein said stop means is positioned on each end of said base so that said base is releasably retained in said track when either end of said base is in an extended telescoping relationship with an end of said track means.

14. A storage rack assembly according to claim 12 wherein said stop means comprises a protrusion on an end of said base and an opening in a corresponding portion of said channel so that said protrusion engages said opening when said rack tips slightly by gravity when said rack is in said extending, telescoping relationship.

15. A storage rack assembly according to claim 12 wherein said stop means comprises a spring clip having a spring stop bearing against said upper portion of said track channels and an opening in said track channels in registry with said spring stop.

16. A storage rack assembly according to claim 11 wherein said base is an extruded shape with an elongated central portion and elongated inwardly-facing channels at the sides thereof, and further having laterally-projecting flanges which are received in said track channels.

* * * * *

UNITED STATES PATENT AND TRADEMARK OFFICE
CERTIFICATE OF CORRECTION

PATENT NO. : 4,887,725

DATED : December 19, 1989

INVENTOR(S) : Andrew J. VanNoord

It is certified that error appears in the above-identified patent and that said Letters Patent is hereby corrected as shown below:

Column 12, line 11, claim 7:

"1" should be --6--.

Signed and Sealed this

Tenth Day of September, 1991

Attest:

HARRY F. MANBECK, JR.

Attesting Officer

Commissioner of Patents and Trademarks